(12) United States Patent
Downs

(10) Patent No.: US 8,715,587 B1
(45) Date of Patent: May 6, 2014

(54) VENT BOOSTER

(71) Applicant: Cleo Downs, Portage, IN (US)

(72) Inventor: Cleo Downs, Portage, IN (US)

( * ) Notice: Subject to any disclaimer, the term of this patent is extended or adjusted under 35 U.S.C. 154(b) by 0 days.

(21) Appl. No.: 13/648,691

(22) Filed: Oct. 10, 2012

(51) Int. Cl.
*A61L 9/00* (2006.01)
*B01D 53/02* (2006.01)
*B01D 45/00* (2006.01)
*B01D 51/00* (2006.01)

(52) U.S. Cl.
USPC ............... 422/306; 55/342; 55/418; 96/224; 96/108; 96/226; 96/228

(58) Field of Classification Search
USPC ............... 422/4–5, 28, 120, 123–124, 306; 55/342, 418, 4–5, 28, 120, 123–124, 55/306; 96/224, 108, 226, 228
See application file for complete search history.

(56) References Cited

U.S. PATENT DOCUMENTS

2012/0222851 A1* 9/2012 Arinez et al. ............... 165/247

* cited by examiner

*Primary Examiner* — Monzer R Chorbaji
(74) *Attorney, Agent, or Firm* — Botkin & Hall, LLP; Michael D. Marston

(57) ABSTRACT

A vent booster is provided which includes a filter array and a fan. The vent booster is integrated into the cold air return of a home ventilation system. The filter array includes a series of filters which remove particulates and odors from the air. The integrated fan assists in forcing air through the filters. A reservoir for dispensing deodorizers or odorizers to the air is included within the vent booster.

15 Claims, 2 Drawing Sheets

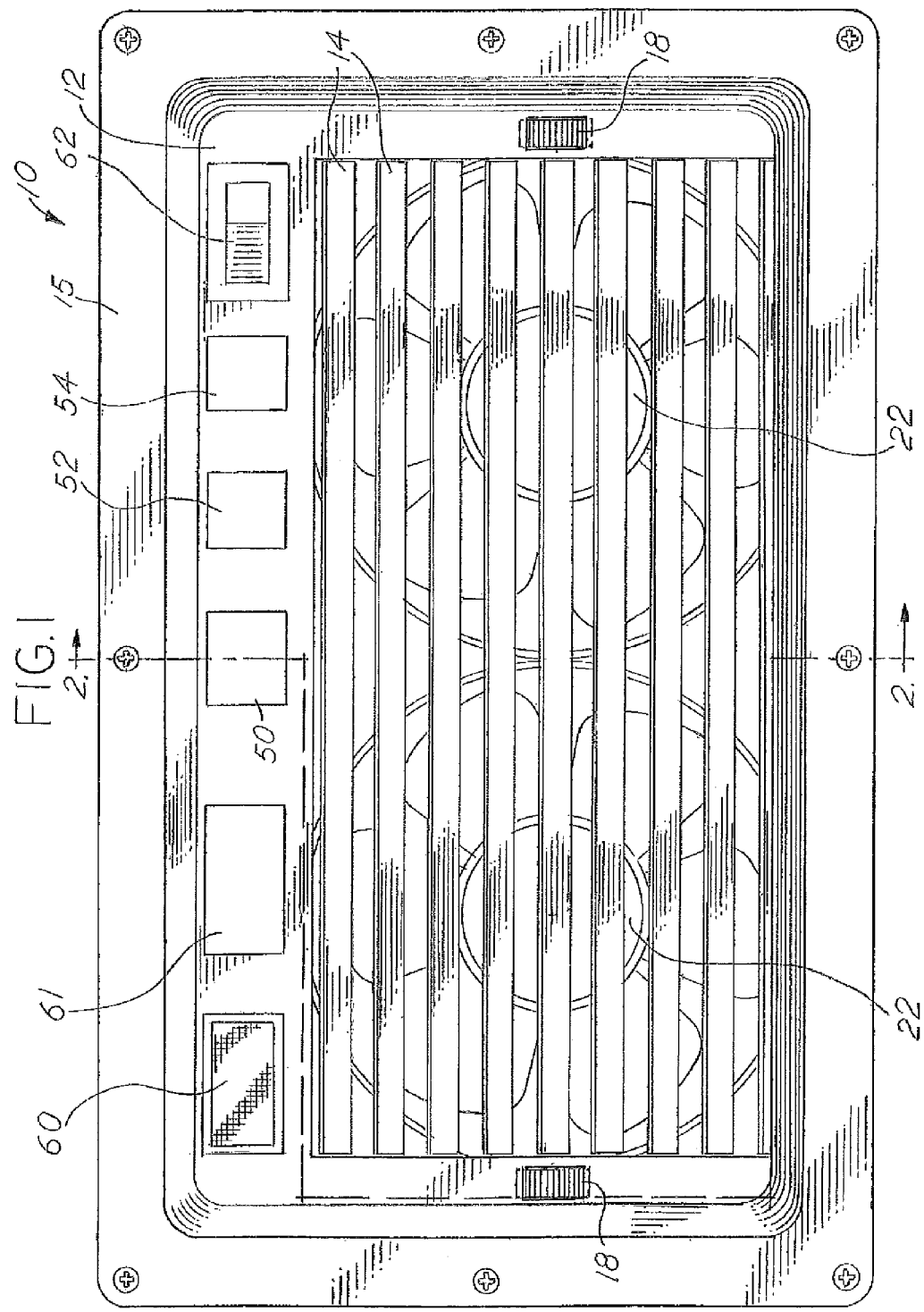

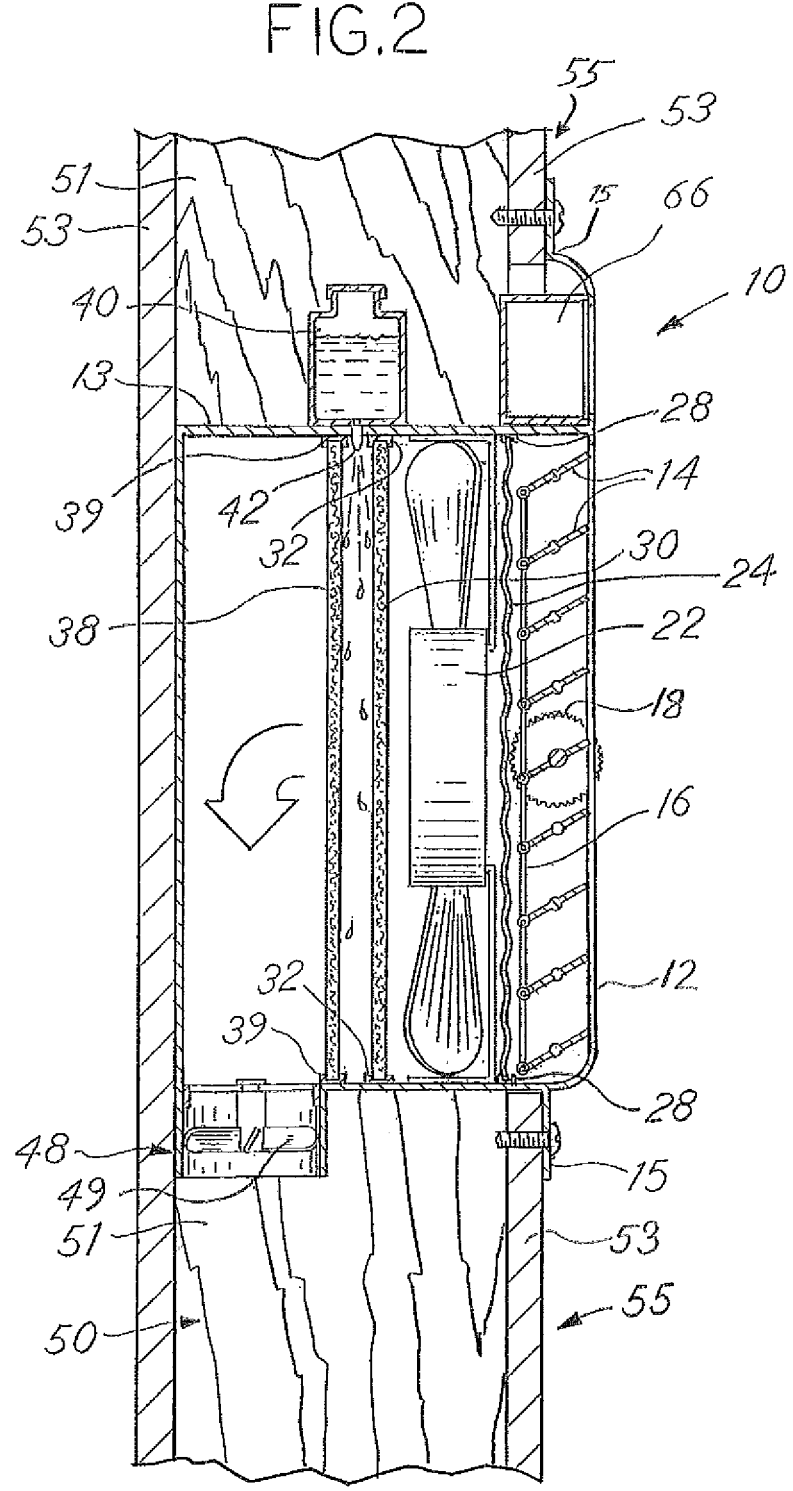

VENT BOOSTER

CROSS REFERENCE TO RELATED APPLICATIONS

This application claims the benefit of U.S. Provisional Application No. 61/545,366, filed Oct. 10, 2011, the disclosure of which is hereby incorporated by reference.

BACKGROUND OF THE INVENTION

Home furnaces provide some, but not much, filtration. Their structure is often not conducive to good filtration. Typically, air is drawn down cold air returns into the furnace. The cold air returns are located in various rooms throughout the house. At the end of an inlet duct, to which the cold air returns are joined, there is a filter ahead of a blower. The blower on a furnace is usually a large and sometimes multiple horsepower motor that can easily distribute air through the house. The filter on a furnace typically serves only one function, and that is to remove large particulates.

Small particulates and odors are more effectively filtered out of the air in a multistage process. Odors are not often dealt with in an ordinary furnace filter. The treatment of air, such as distributing chemicals, medications, aromas, or other deodorizers is not possible through an ordinary furnace filter. Some filters which claim to be able to filter small particles or odors from the air are unsuitable because most standard furnaces do not have sufficiently powerful blower motors to move air through the tight weave patterns of these filters. As such, an improved furnace filtration system is needed.

SUMMARY OF THE INVENTION

In an existing furnace installation it is desirable to have a retrofitable device that can be placed in the location of an ordinary cold air return to assist the furnace with additional filtration and disbursement of desired chemical treatments. The present disclosure describes a vent booster which is positionable within a cold air return and includes a fan and a filter array. Such filter array aids in cleaning the air which is drawn into the cold air return and removes odors and particulates therefrom. An air flow sensor is integrated into the vent booster, which the sensor adapted for integration into the vent booster, with the sensor adapted for actuating the fans on and off and also providing an indication when the filters in the filter array are due to be replaced. A reservoir is included with the vent booster to provide deodorizers or odorizers to the air stream for treating the air in the house.

BRIEF DESCRIPTION OF THE DRAWINGS

FIG. 1 is a front view of the invention with the first filter removed so that the fans are visible; and FIG. 2 is a sectional view of the booster shown in FIG. 1 with the first filter installed.

DETAILED DESCRIPTION OF THE PREFERRED EMBODIMENT

The present invention is a vent booster 10 for use in place of a traditional vent grille. The booster has a front plate 12 that is connected to a housing 13. Louvers 14 span the front plate 12 as would be done in a traditional grille for a furnace cold air return. The front plate 12 also has a mounting flange 15 that is offset rearward from the front plate 12. The louvers 14 are pivotally connected to a linkage rod 16 at their rearward edge.

The linkage rod 16 is also pivotally connected to an adjustment wheel 18. The adjustment wheel 18 is located in the approximate center of the front plate 12. As can be seen in FIG. 1, there is an adjustment wheel 18 on either side of the louvers 14. As the adjustment wheel 18 is turned, the louvers may be opened or closed.

Behind the adjustment wheels are two fans 22. The fans 22 draw air inward from the room and into the vent booster 10. Vent booster 10 includes a filter array, preferably the filter array includes a first filter 24, a second filter 30, and a third filter 38, each described in greater detail herein. The first filter 24 is spaced between the fans 22 and the louvers 14. The first filter 24 is a corrugated filter used to remove large particles from air taken into the booster 10. The first filter 24 is corrugated to have a relative large surface area so that it will not clog too quickly and will also serve as a first stage of filtration for subsequent filters. A first set of channels 28 on the top and bottom of the first filter 24 retain the filter in the vent booster 10.

Behind the fans 22 is a second filter 30. The second filter 30 is an activated charcoal filter which serves the purpose of removing odors from air drawn into it, and also removes finer particulates than the first filter. This is particularly useful for removing smoke from air taken into the booster 10, as well as many other common irritating odors or airborne volatiles. The second filter 30 is retained in the vent booster 10 by a second set of channels 32.

The third filter 38 is located behind the second filter 30 and retained in the vent booster 10 by third channels 39. The third filter 38 is a treated filter that may include chemicals such as medications to assist breathing, aroma therapy, further deodorizers, or any other desired chemical to be dispersed into the air leaving the booster 10. Initially, the third filter 38 will include the desired chemicals and these chemicals will be depleted over time as the chemicals are dispersed into the air. The life of the third filter 38 may be extended through the use of a reservoir 40 that is located above the third filter 38. The reservoir 40 is connected to a nozzle 42 located in front of the third filter 38. As air moves toward the third filter 38 it will blow the chemicals contained in the reservoir 40 onto the third filter 38. The reservoir 40 may be pressurized through use of a plunger or other device to dispense the correct amount of chemicals at specific predetermined intervals or when needed.

The air, after passing through the third filter 38, will then enter an air flow sensor 48. The air flow sensor 48 serves multiple purposes within the invention. A first purpose is to signal the unit to start the fans 22. The vent booster 10 of this invention is installed in a cold air return duct 50 in the same manner as conventional louvered vent covers. When the furnace turns on, air is drawn into the furnace through the cold air return duct 50 shown in FIG. 2. FIG. 2 shows the cold air return duct 50 formed by studs 51 located between drywall 53 used to form the exterior of the wall 55 in which the vent booster 10 is installed. The moving air in the duct 50 will cause the blades 49 of the air flow sensor 48 to move, thus, indicating to the booster 10 that the furnace is on. The booster 10 is only intended to boost airflow through it, and would not have sufficient power to distribute air throughout the entire duct system of a home, so it is important that the vent booster 10 only be on when the furnace is on. As such, air moving past blades 49 of air flow sensor 48 causes air flow sensor 48 to send a signal which activates fans 22. The fans 22 and unit may be battery powered, but it is preferable to use the electrical system of the home to reduce the necessary maintenance of changing batteries.

A second function of the air flow sensor 48 is to provide notice that one or more of the filters 24, 30, 38 needs to be changed. If the large blower motor on the furnace causes the air flow sensor 48 blades 49 to rotate, and subsequently the fans 22 in the booster 10 spinning do not cause the blades 49 to rotate by a predetermined higher rate than before the fans 22 were on, it will serve as an indication that one or more of the filters are clogged. Clogged filters may be indicated individually as clogged by filter indicator lights 50, 52, 54 or if the vent booster is suffering from a generally sluggish air flow, all three indicator lights 50, 52, 54 may illuminate. Indicator light 50 shows the first filter 24 is clogged, 52 for the second filter 30, and 54 for the third filter 38. Each filter 24, 30, 38 may be found to be individually clogged by a light and sensor located on opposite sides of each filter or other signaling device that determines that each filter is sufficiently full of particulates to warrant replacement. Air flow sensor 48 may be calibrated to calculate the duration of time each filter 24, 30, 38 has been in the vent booster 10, and to provide an indication with indicator lights 50, 52, 54 when it is time to replace one or more of the filters according to a defined replacement schedule. Such schedule can be related to total time the filters are present in the vent booster, or amount of time the filters are present while fan 22 is active.

The vent booster 10 also includes a hazardous gas detector (not shown) suitable for detecting smoke or carbon monoxide. The hazardous gas deterctor, which is not shown, may be located immediately behind the louvers 14 so that the hazardous gases are not filtered before reaching the sensor. A speaker 60 is located on the front plate 12 so that it will produce an audible tone upon detection of smoke or carbon monoxide.

A display screen 61 is located on front plate 12. This digital display screen 61 provides information on how the booster 10 is functioning. The display shows when the booster 10 is dispensing the chemicals contained in the reservoir 40. It will also display the type of chemical being dispensed into the system, which may be an air freshener, medication, or other aroma-type chemical. The battery life will be displayed in the case that the unit is a battery-powered unit. The display screen 61 will also show how much of the chemical remains in the reservoir 40. The display screen 61 will also show if chemicals are being dispensed from the reservoir 40. A user of the booster 10 may chose not to dispense chemicals, or chose to dispense chemicals. The display screen 61 will indicate which mode the booster 10 is in at all times when it is on. The fact that the booster 10 is on will also be displayed on the display screen 61. The levels of carbon monoxide and, if present, smoke will be displayed on the display screen 61. The temperature of air in the room is displayed on the screen 61 as well, such temperature measured by an integrated thermometer (not shown).

A power switch 62 is located on the front plate 12. The switch 62 does not immediately start the fans 22 running, but readies the unit for when the air flow sensor 48 indicates that fans 22 should activate, such as when the blower motor of the furnace draws air through the cold air return duct 50. Once air is drawn in by the furnace, the fans 22 will start. This enables a user of the vent booster 10 to be free from constantly having to manage settings on the booster 10.

An electrical box 66 is located inwardly of the front plate and recessed into the wall 55. Within the electrical box 66 are the components used to control, power, and connect the various functions of the booster 10. A portion of the flange 15 of the front plate 12 is spaced away from exterior wall 55 to provide additional room for electrical box 66 to be housed in air vent booster 10. In this way, flange 15 is offset rearward of the front plate, providing additional room behind the front plate for the housing. In most homes there is a limited amount of space in the wall, typically the width of the lumber from which the frame of the wall is constructed. Thereby, having flange 15 offset rearwardly from the front plate effectively adds additional space for housing 13.

In one embodiment, vent booster 10 includes an integral hinge which allows front plate 12 to rotate to open vent booster 10. Thereby, front plate 12 is hingedly connected to the vent booster 10, which allows the filter array and fan assembly to rotate with front plate 12 to a position generally perpendicular to the orientation when housed in the vent booster. Thereby, front plate 12 is readily openable to allow replacement of filters 24, 30, 38 or refilling of reservoir 40.

The vent booster 10 described herein allows for significant increases in the filtering efficiency of a home furnace. By providing additional filters, more and smaller particulates will be filtered from the air, while also removing odors from the air. Further, fans 22 provide increased air flow, which helps to force the air through the filter array—it is the lack of such additional force that is the failing of other filter-only solutions. Additionally, the reservoir 40 allows dispersal of substances which either deodorize or odorize the air. Further, by integrating a smoke and/or carbon monoxide detector into the air circulation system, the chances of catching a hazardous condition are greatly increased since the natural flow of air in a home is through the cold air return. Further still, the vent booster 10 is self-contained, meaning that it will cycle on and off without needing to be wired to the furnace or home temperature controls, as such, fan 22 will cycle on and off as the furnace's blow motor is cycled on and off.

The vent booster 10 described herein is discussed with reference to an associated furnace. This reference is merely an illustrative example of one use of the vent booster. Of course, the vent booster 10 is also suitable for use with an air conditioning unit, or other unit which circulates air throughout a home.

The vent booster 10 includes an air pathway, whereby as air passes through the vent booster the air is guided along a path where the air first passes through the louvers 14, then passes through first filter 30, then passes by fan 22, next passes through second filter 24, then passes through third filter 38, and lastly passes through flow sensor before continuing to the furnace. Wherein, the louvers 14 serve as an inlet to the air pathway and the flow sensor 48 serves as an outlet to the air pathway.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A vent booster comprising:
   a front plate;
   a housing connected behind said front plate;
   louvers within said front plate for adjusting or regulating the flow of air therethrough;
   fans behind said louvers;
   a first filter is located between said fan and said louvers for removing large particulates from said air;
   a second filter behind said fan for removing odors and removing smaller particulates from said air than said first filter;

a third filter behind said second filter for adding desired chemicals to said air passing through said vent booster;

an air flow sensor behind said fan for detecting the movement of said air through said vent booster;

wherein said vent booster includes a reservoir for dispensing said chemicals onto said third filter.

2. A vent booster as claimed in claim 1, further comprising a hazardous gas detector ahead of said first filter.

3. A vent booster as claimed in claim 2, wherein said front plate includes a flange being offset rearward of said front plate for providing additional room for said housing in a wall of a structure.

4. A vent booster as claimed in claim 1, wherein said vent booster includes a display screen for displaying the status in which said booster is operating.

5. A vent booster as claimed in claim 4, wherein said display screen displays whether said chemicals from said reservoir are being dispensed.

6. A vent booster as claimed in claim 1, wherein said chemicals are forced from said reservoir by a plunger.

7. A vent booster as claimed in claim 6, wherein said chemicals may be an aromatic, medication, or deodorizer.

8. A vent booster having an air pathway through which air passes through said vent booster, said vent booster positioned in the place of a cold-air return of a building's ventilation system, said air pathway comprising:

a louver defining an inlet of said air pathway;

a first filter positioned downstream of said louver;

a fan positioned downstream of said first filter;

a second filter positioned downstream of said fan;

a third filter positioned downstream of said second filter;

a flow sensor positioned downstream of said third filter, said flow sensor defining an outlet of air pathway; and a reservoir located between said second filter and said third filter.

9. The vent booster of claim 8, wherein said reservoir dispenses a chemical, wherein said chemical may be an aromatic, medication or deodorizer.

10. The vent booster of claim 9, and a display screen for displaying the status in which said vent booster is operating.

11. A vent booster as claimed in claim 10, wherein said display screen displays whether said chemicals from said reservoir are being dispensed.

12. The vent booster of claim 8, wherein said flow sensor serves as a trigger for activating said fan.

13. The vent booster of claim 8, and a front plate carrying said louvers.

14. The vent booster of claim 13, and a flange extending from said front plate and offset rearwardly from said front plate.

15. The vent booster of claim 8, and a hazardous gas detector positioned before said first filter in said air pathway.

\* \* \* \* \*